United States Patent [19]

Baker et al.

[11] Patent Number: 5,224,252
[45] Date of Patent: Jul. 6, 1993

[54] SPLIT YARN ROLL

[76] Inventors: Jimmy N. Baker; Rose E. Baker, both of 6114 Secrest Shortcut Rd., Monroe, N.C. 28110

[21] Appl. No.: 918,468

[22] Filed: Jul. 22, 1992

[51] Int. Cl.$^5$ .................. B21B 31/08; B60B 7/04; B60B 7/06
[52] U.S. Cl. .................. 492/38; 242/18 DD; 29/463
[58] Field of Search .......... 29/124, 110, 463; 242/18 DD, 68.5, 115, 118

[56] References Cited

U.S. PATENT DOCUMENTS

| 753,344 | 3/1904 | Witham | 242/115 |
|---|---|---|---|
| 1,646,472 | 11/1925 | Brandwood . | |
| 1,730,820 | 10/1929 | Holden | 29/124 |
| 1,981,771 | 8/1932 | Benge . | |
| 3,355,758 | 12/1967 | Clark | 29/124 |
| 3,657,779 | 4/1972 | Granberry | 29/124 |
| 3,784,120 | 1/1974 | Harris | 29/124 X |
| 4,176,804 | 12/1979 | Nemoto et al. | 242/68.5 |
| 4,433,815 | 2/1984 | D'Agnolo . | |
| 4,448,628 | 5/1984 | Stott | 29/124 X |
| 4,832,281 | 5/1989 | Payne, Jr. et al. . | |

Primary Examiner—Mark Rosenbaum
Assistant Examiner—C. Richard Martin
Attorney, Agent, or Firm—Shefte, Pinckney & Sawyer

[57] ABSTRACT

A composite yarn engaging roll for textile machines which is adapted for mounting on the shaft of a machine and which comprises two semi-cylindrical members is disclosed. Each of these members has an outer portion with an outer semi-cylindrical surface complementary with the outer surface of the other member which forms a cylindrical outer surface of the composite roll. The members also have an inner portion with an inner semi-cylindrical surface spaced from the outer semi-cylindrical surface and complementary with the inner surface of the other member to form an inner semi-cylindrical surface of the composite roll. The composite roll is dimensioned for mounting on a shaft. The composite also has an axially extending web portion disposed between the inner and outer portions of each member. Each member also contains a device for releasably interlocking the two members which is incorporated into the web portion of each member and disposed for axial sliding engagement with the releasably interlocking device of the other member for interlocking the two semi-cylindrical members in an interlocked position to form the composite roll.

13 Claims, 5 Drawing Sheets

SPLIT YARN ROLL

FIELD OF THE INVENTION

The present invention relates to textile machines, such as yarn winders, and, more particularly, to yarn rolls employed in such machines.

BACKGROUND OF THE INVENTION

In the textile industry, yarn is handled by winding yarn from spindles or packages onto other packages. In some of these winders, yarn is wound around an elastic core yarn to form a wrapped elastic yarn. With all winders, yarn is guided by rolls over which the yarn passes and is guided.

The take-up packages and supply packages are arranged so that each package is in contact with a roll and the rolls are mounted on shafts that extend through all or at least a plurality of winding stations on the machine for support of a plurality of rolls on each shaft. Whether the yarn is being unwound or wound, yarn moves over the rolls and onto or off the packages. Since the roll is in contact with the package, movement of the roll rotates the package, therefore facilitating the winding or unwinding operation.

If a problem occurs with one of the rolls and removal of the roll from a shaft is necessary, the machine must be shut down, the shaft removed, and all rolls between the end of the shaft and the roll needing to be removed must be taken off the shaft, after the defective roll is replaced, the other rolls must be returned onto the shaft, and the shaft remounted on the machine. This results in a long down time for the winding machine. Thus, an improved yarn roll is needed to reduce the above-mentioned down time.

U.S. Pat. No. 4,832,281 to Payne, Jr., et al discloses a yarn package having complementary semi-cylindrical halves adapted to be fitted together for insertion into a sleeve of the type onto which a yarn package is built. However, Payne does not disclose either a yarn roll to avoid the above-mentioned problems or any structure for mechanically interlocking the complementary semi-cylindrical yarn package halves together.

SUMMARY OF THE INVENTION

It is therefore an object of the present invention to provide a yarn roll structured so as to reduce down time of a winding machine during yarn roll removal.

It is a further object of the present invention to provide for a yarn roll having a structure allowing a single yarn roll to be removed from the center of a textile machine shaft without the need for removal of other yarn rolls.

These and other objects of the present invention are accomplished by a composite yarn engaging roll for textile machines which are adapted for mounting on the shaft of a machine and which comprise two semi-cylindrical members. Each of these members has an outer portion with an outer semi-cylindrical surface complementary with the outer surface of the other member which forms a cylindrical outer surface of the composite roll. The members also have an inner portion with an inner semi-cylindrical surface spaced from the outer semi-cylindrical surface and complementary with the inner surface of the other member to form an inner semi-cylindrical surface of the composite roll. The composite roll is dimensioned for mounting on a shaft. The composite also has an axially extending web portion disposed between the inner and outer portions of each member. Each member also contains a device for releasably interlocking the two members which is incorporated into the web portion of each member and disposed for axial sliding engagement with the releasably interlocking device of the other member for interlocking the two semi-cylindrical members in an interlocked position to form the composite roll.

The interlocking device may also comprise at least one slot formed in the web portion of the member which extends axially from an axially facing opening in an edge of the web portion and at least one projection extending from the web portion of the other of the members in axial alignment with the at least one slot for axial sliding engagement in said at least one slot to assemble and maintain the members in the form of the composite roll and for axially sliding disengagement to disassemble the composite roll.

The at least one slot may have an effective axial extent only slightly greater than the corresponding effective axial extent of the at least one projection, whereby assembly and disassembly of the members can be performed in an axial space only slightly greater than the axial extent of the roll plus the corresponding effective axial extent of the at least one projection. The at least one slot may be formed in the web portion of each member and at least one of the projections may extend from the web portion of each member each projection of one member being axially aligned with one of the slots of the other member. In one embodiment, the members are substantially identical and one of the slots of each member are relatively oppositely symmetrically disposed axially and radially for engagement of a projection of one member in a slot of the other member with the members being axially reversed. Each member may have two of the slots in and two projections extending from the web portion of each member with both of the slots and both of the projections equally spaced radially in both of the slots and both of the projections equally spaced from the ends of the members with the slots spaced from one end and the projections spaced from the other end of each member.

The web portion of each member may have a diametrically extending surface disposed in face-to-face abutting relation to the diametrically extending surface of the web portion of the other member with at least one slot being formed in and at least one projection extending from the diametrically extending surfaces.

The at least one projection may have an outer end spaced from the web portion which has a transfer extent greater than the at least one slot and the web portion that has at least one slot may have a thickness transverse to the diametrically extending surface substantially equal to the spacing of the projecting outer end from the web portion from which it extends. The at least one projection may also have an outer end having a transverse extent greater than the at least one slot for radial retention of the members in assembled condition.

The transverse extent of the opening of the at least one slot and the corresponding transverse extent of the at least one projection may form a substantially tight fit and the at least one slot may widen inwardly of the opening to facilitate retention of the at least one projection of one member in the at least one slot of the other member and the members in assembled relation.

The members may be substantially identically formed and each member may have at least one of the slots and at least one of the projections with each of the at least one slot and one of the least one projection of each member being spaced substantially equally from opposite axial ends of the members whereby the members are interlocked with one member axially reversed with respect to the other member. The members may be formed of molded plastic material and may be moldable in a common mold. The members may have inwardly projecting axial extending ridges on the inner surfaces of the inner portions to facilitate mounting and retention of the composite roll on the shaft.

Further features and advantages of the present invention will be apparent from the drawings and the following detailed description of the preferred embodiment.

DETAILED DESCRIPTION OF THE INVENTION

Figure 1:
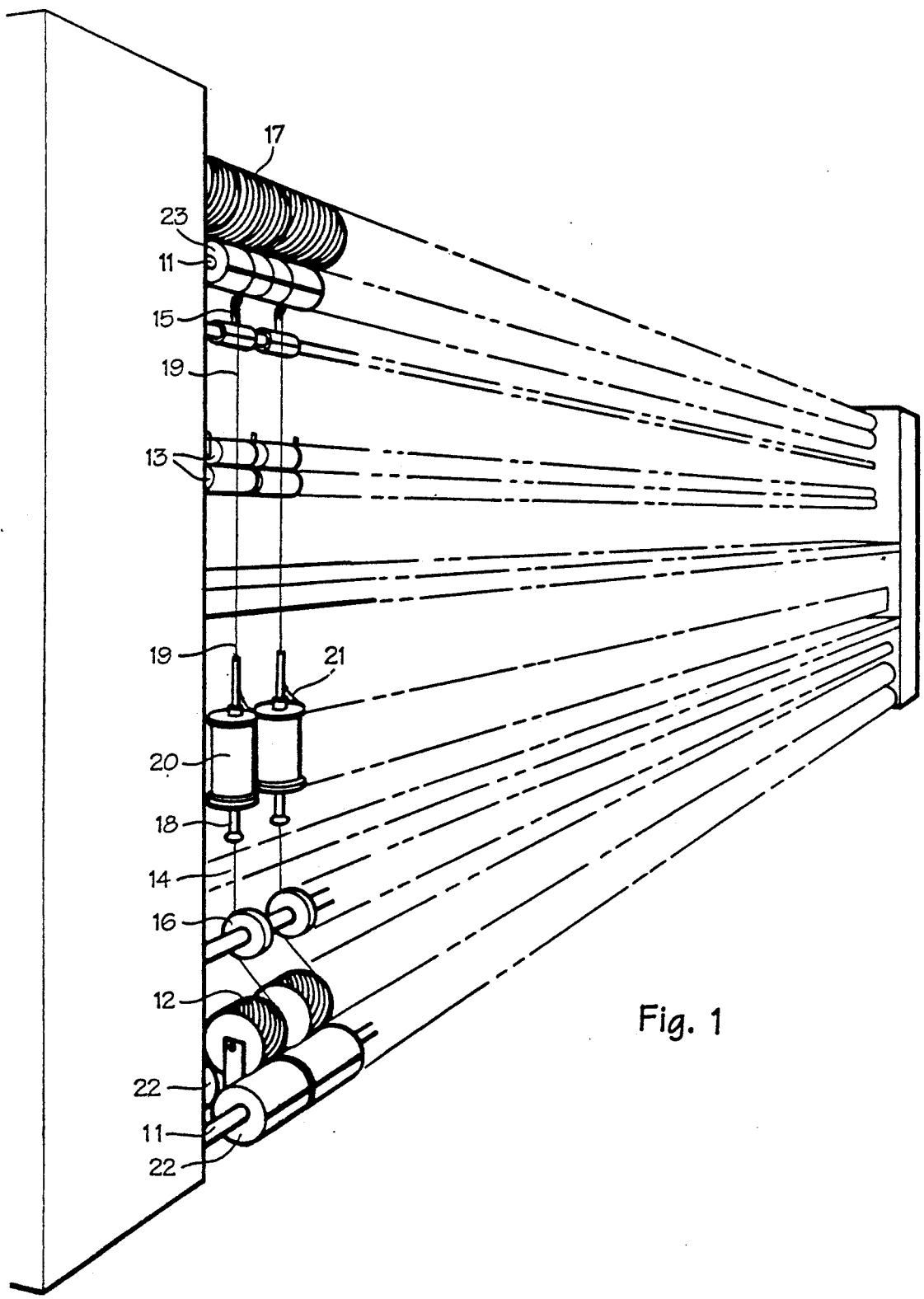
FIG. 1 illustrates a portion of a typical textile winding machine.

Referring now to FIG. 1, a textile winding machine 10 is shown. On this particular winding machine 10, at each winding station, Spandex yarn 14 is fed from a package 12 under a wheel 16 and through a hollow tube 18 for travel through a spool 20 on which nylon yarn 21 is wound, with the Spandex yarn 14 forming the core and the nylon yarn 21 forming the wound cover of a composite yarn 19 that is wound onto a take-up package 17. The spool 12 of Spandex yarn is rotated by a feeder roll 22 over which the Spandex yarn 14 is guided. The wrapped yarn 19 travels between two drafting rolls 13 and a traverse guide 15 onto yarn packages 17. The yarn package 17 is rotated by a yarn take-up drive roll 23. The feeder rolls 22 and take-up rolls 23 are mounted on the winding machine 10 on shafts 11. Prior to the present invention, each shaft 11 extended through all or a plurality of winding stations such that each shaft carries a plurality of rolls. If one of the rolls needed to be removed, the shaft and all the rolls between the one to be removed and the end of the shaft also needed to be removed, resulting in a long down time for the winding machine and increased efficiency of the overall operation.

Figure 3:
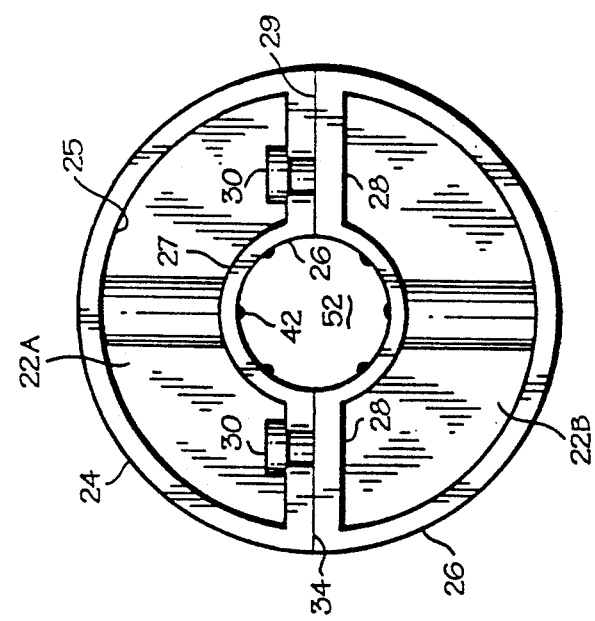
FIG. 3 is an end view of the preferred embodiment of the roll of FIG. 2 in an interlocked position.
Figure 2:
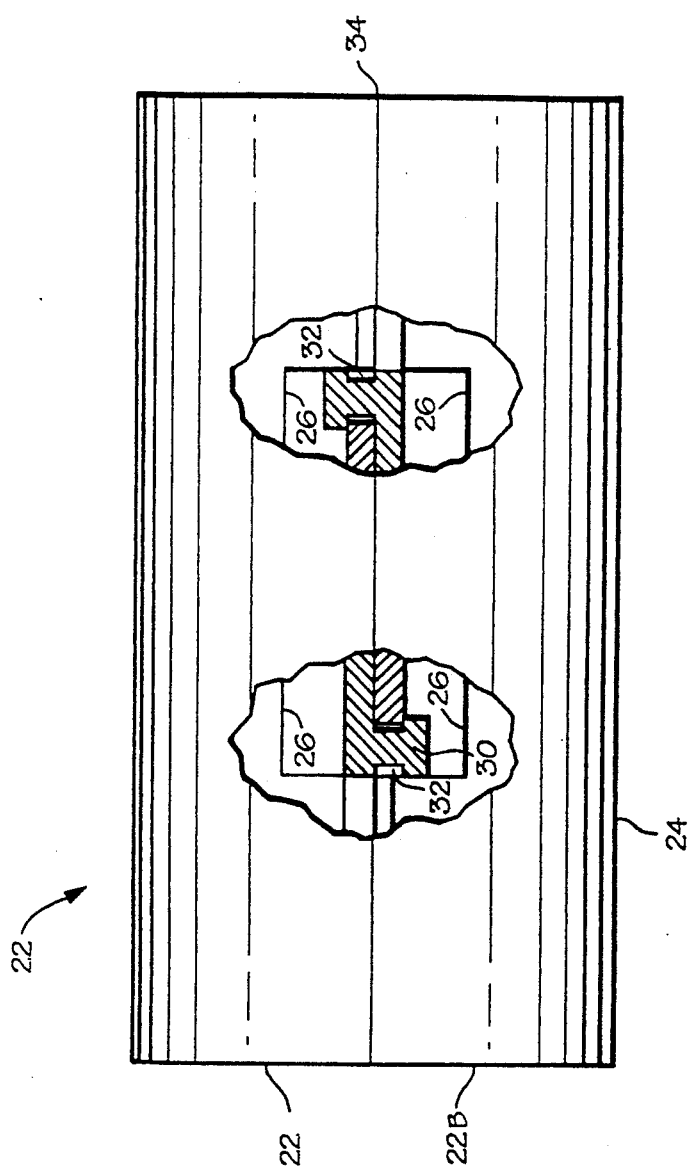
FIG. 2 is a side view of one embodiment of the two semi-cylindrical halves of the roll of the present invention partially broken away to illustrate the interlocking elements.
Figure 4:
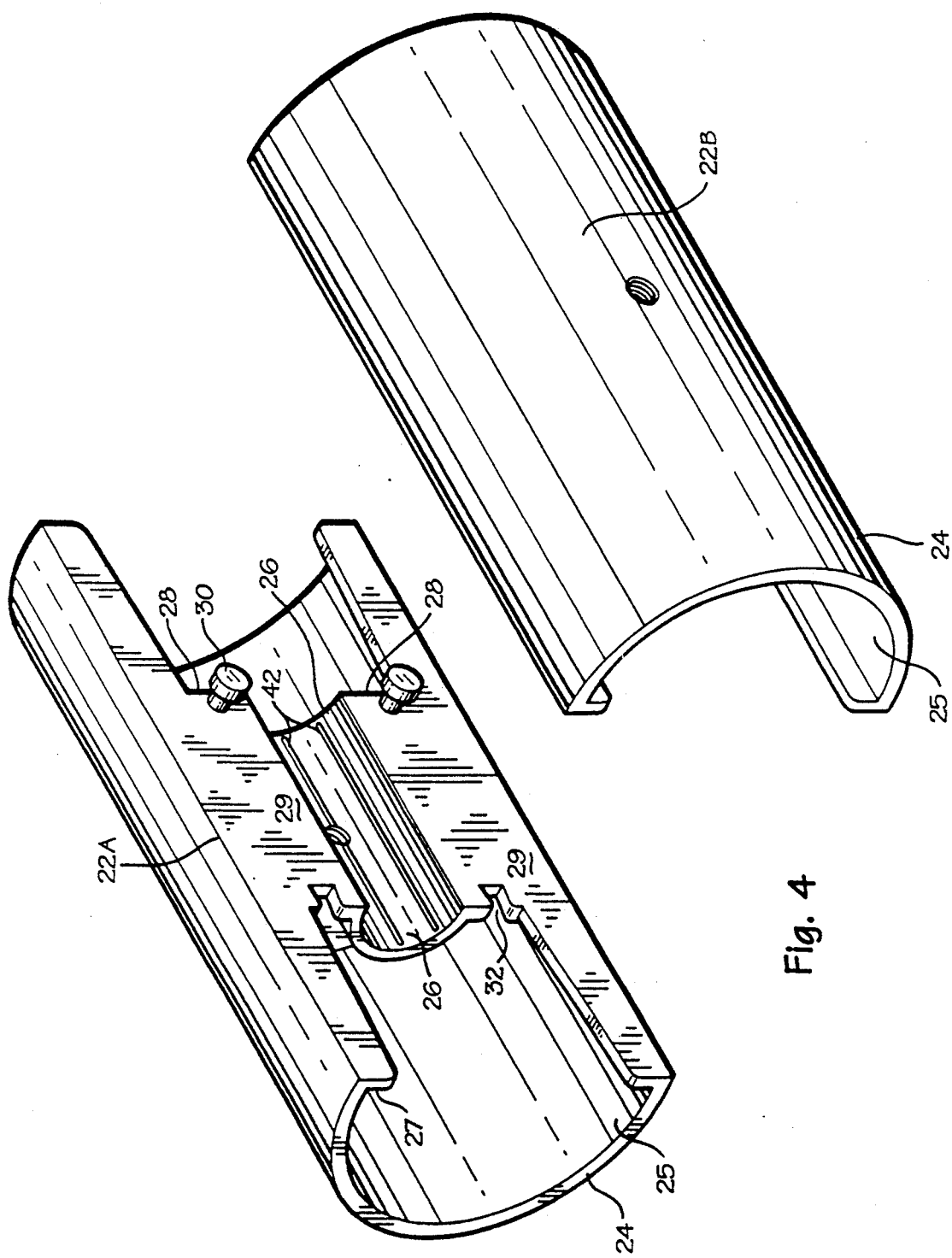
FIG. 4 is an exploded view of the preferred roll of FIG. 2.

Referring now to FIGS. 2, 3 and 4, it will be seen that the present invention addresses the previously mentioned problems presented by existing yarn feeder and take-up rolls 22,23. This embodiment has two semi-cylindrical members or halves 22A and 22B. The members are preferably formed of plastic. Each half has an outer portion 25 with an outer semi-cylindrical surface 24 and an inner portion 27 with an inner semi-cylindrical surface 26 spaced from the outer surface 24 via axially extending web portions 28 seen in FIG. 3. The inner and outer portions 27,25 of each half 22A,22B complement the inner and outer portions 27,25 of the other half, forming cylindrical inner and outer surfaces as seen in FIG. 2.

When in the interlocked position shown in FIG. 2, the two semi-cylindrical halves 22A and 22B meet at a diametrical seam 34, which can best be seen in FIG. 3. To achieve the interlocked position, releasably interlocking means are incorporated into the web portions 28 of each half 22A and 22B and are disposed for axial sliding engagement with each other for interlocking the two halves to form the composite roll seen in FIGS. 2 and 3. The releasably interlocking means is in the form of projections or pins 30 and slots 32. The slots 32 are formed to allow the pins 30 to be slid thereinto. Thus, each projection 30 of one member is preferably axially aligned with one of the slots 32 of the other member. The pins 30 may have an outer end spaced from a web portion 28 which has a transverse extent, which is preferably round, greater than the slots 32. The web portion 28 bearing a slot may have a thickness transverse to the diametrically extending surface substantially equal to the spacing of the projecting outer end of the pin from the web portion from which it extends. The outer end may have a transverse extent greater than the slot for radial retention of the members in assembled condition. The pins 30 of one semi-cylindrical half 22A may be slid into the slots 32 of the other semi-cylindrical half 22B as seen in the cutaway portions of FIG. 2. For this purpose the web portions 28 have facing diametrically extending surfaces 29 disposed in face-to-face abutting relation to form the seam 34 when the halves are interlocked and along which surfaces 29 the halves slide relatively during assembly and disassembly of the halves.

In the most preferred embodiment, the members are identically formed and the projections 30 and slots 32 of each member are relatively oppositely symmetrically disposed axially and radially for engagement of a projection or slot in the other member with the members being axially reversed. Moreover, the projections of each member may be spaced substantially equally from opposite axial ends of the members whereby the members are also interlocked with one member axially reversed with respect to the other member. Here, the members may be formed from the same mold.

When assembled on the shaft 11, the inner semi-cylindrical surfaces 26 of the two halves 22A and 22B form a throughbore compatibly dimensioned with respect to the shafts 11 such that the roll is securely mounted to the shaft for rotation therewith. These inner semi-cylindrical surfaces 26 may be formed with inwardly projecting, axially extending ridges 42 to aid in mounting and securely retaining the throughbore 52 formed by the two semi-cylindrical halves 22A and 22B to the shafts 11 should there be any dimensional variations between the shafts 11 and inner surfaces 26. Additionally, to aid in securely interlocking the two semi-cylindrical halves, the slots 32 may be tapered towards the open end of the slot as seen in FIG. 4.

The transverse extent of the opening of the at least one slot 32 and the corresponding transverse extent of the at least one projection 30 may form a substantially tight fit. The at least one slot 32 may widen inwardly of the opening to facilitate retention of the at least one projection 30 of the other member.

Figure 5:
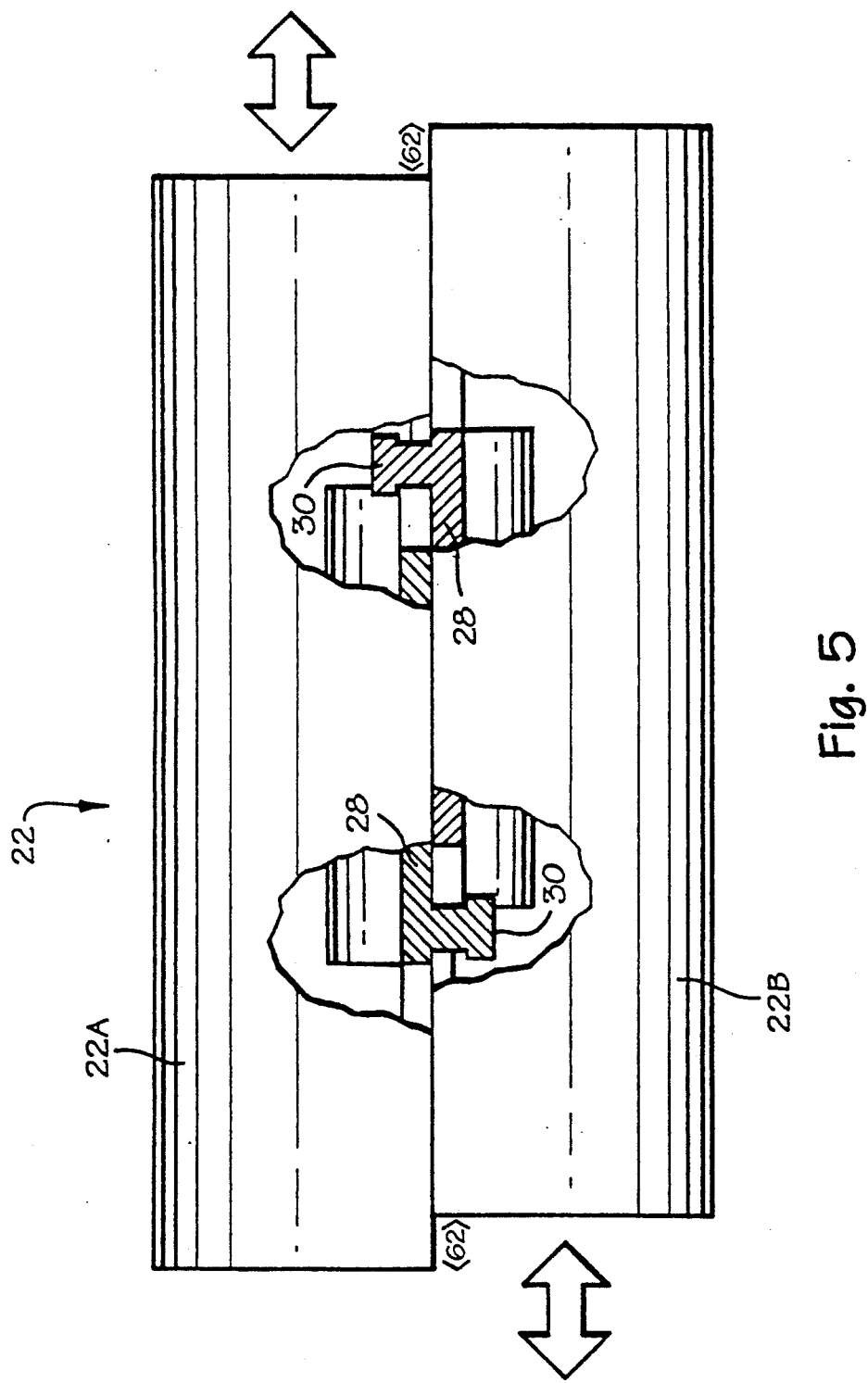
FIG. 5 is a side view of the roll of FIG. 2 shown axially separated sufficiently for the interlocking elements to be disengaged, and partially broken away to illustrate the interlocking elements.
Figure 6:
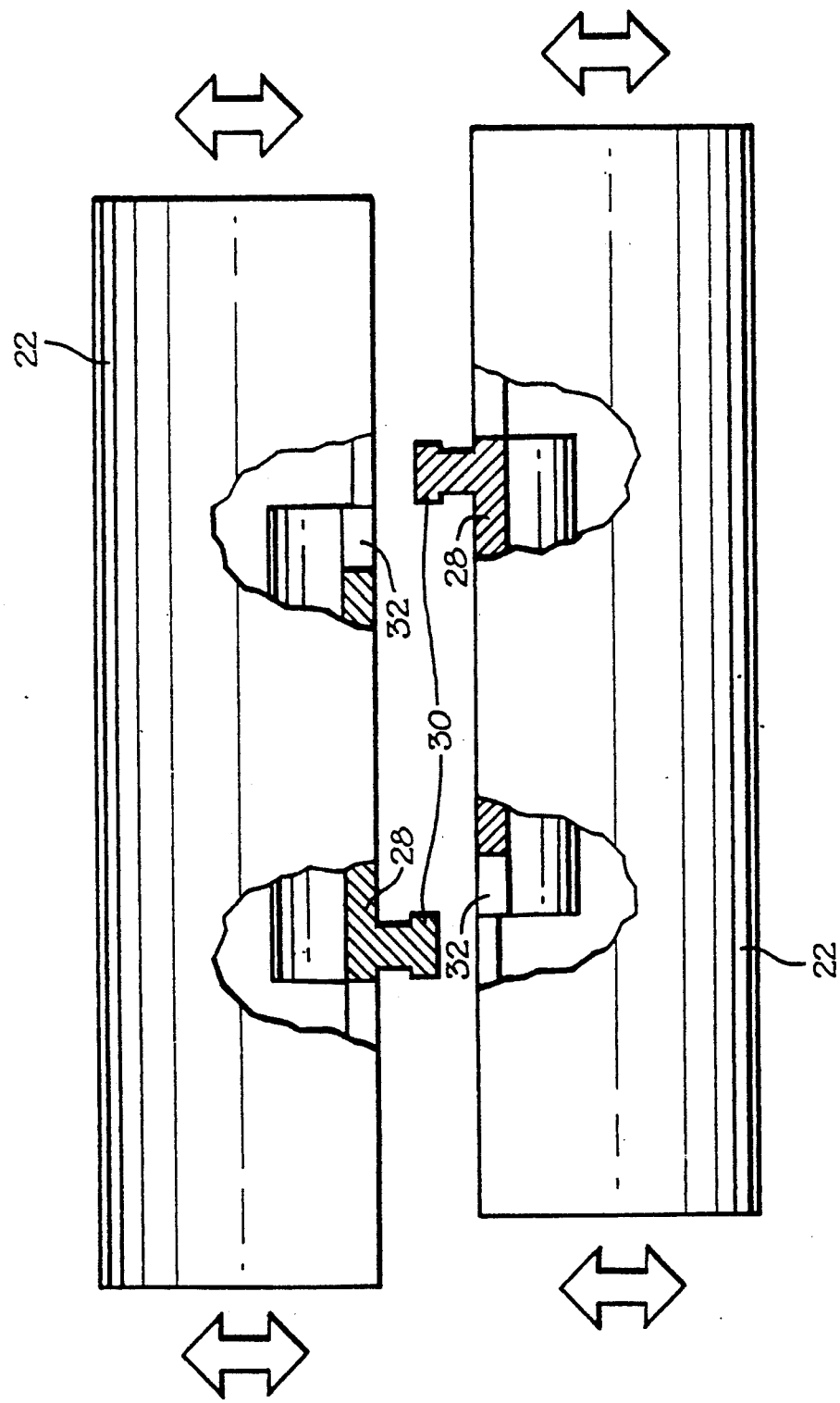
FIG. 6 is a side view of the roll of FIG. 2 illustrating the two semi-cylindrical halves separated in position for engagement or disengagement.

As previously mentioned, one significant advantage of the roll 22 of the present invention is the ability to remove a single roll from a shaft 11 in a winding or other textile machine without having to remove other rolls. This is accomplished via the interlocking construction of the present invention which requires very little axial movement to place the semi-cylindrical members 22A and 22B into their interlocked position or to remove the members from their interlocked position. As seen in FIGS. 5 and 6, in order to remove the members from their interlocked position or to position them in preparation for interlocking, only a small space 62 is needed between adjacent rolls. Such a space requires a slot 32 with an effective axial extent only slightly greater than the corresponding effective extent of the projection 30. The effective extent is the extent that accommodates interlocking engagement of a slot 32 and a projection 30 regardless of any greater extent that does not accommodate such engagement. In this regard, FIG. 5 illustrates the small space 62 required to accommodate axial assembly or disassembly movement with FIG. 6 illustrating the diametrical movement to fully remove or initially position the members.

In summary, a unique roll for use in a textile machine, particularly a textile winding machine, is disclosed. The roll of the present invention has two halves which may be identical each having an outer portion having an outer semi-cylindrical surface and an inner portion having an inner semi-cylindrical surface spaced therefrom via a web portion. The two halves are assembled onto a shaft, such as the type of shaft upon which a number of such rolls are commonly mounted for the winding and unwinding of yarn. The halves are provided with an interlocking mechanism requiring only small axial movement to lock or unlock the halves. Consequently, only a single yarn roll need be removed from the shaft when necessity or desire requires the removal.

It will therefore be readily understood by those persons skilled in the art that the present invention is susceptible of a broad utility and application. Many embodiments and adaptations of the present invention other than those herein described, as well as many variations, modifications and equivalent arrangements will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

We claim:

1. A composite yarn engaging roll for textile machines and adapted for mounting on a shaft of the machine comprising:
    two semi-cylindrical members, each said semi-cylindrical member having an outer portion with an outer semi-cylindrical surface complementary with the outer surface of the other member to form a cylindrical outer surface of said composite roll, an inner portion with an inner semi-cylindrical surface spaced from said outer semi cylindrical surface and complementary with the inner surface of the other member to form an inner cylindrical surface of said composite roll dimensioned for mounting of the composite roll on the shaft, and an axially extending web portion disposed between said inner and outer portions; and
    releasably interlocking means incorporated in said web portion of each member and disposed for axial sliding engagement with the releasably interlocking means of the other member for interlocking said two semi-cylindrical members in an interlocked position to form said composite roll.

2. The composite roll according to claim 1 wherein said means for interlocking comprises:
    at least one slot formed in said web portion of one of said members and extending axially from an axially facing opening in an edge of said web portion; and
    at least one projection extending from said web portion of the other of said members in axial alignment with said at least one slot for axial sliding engagement in said at least one slot to assemble and maintain said members in the form of said composite roll and for axial sliding disengagement to disassemble said composite roll.

3. The composite roll according to claim 2 wherein said at least one slot has an effective axial extent only slightly greater than the corresponding effective axial extent of said at least one projection, whereby assembly and disassembly of said members can be performed in an axial space only slightly greater than the axial extent of the roll plus said corresponding effective axial extent of said at least one projection.

4. The composite roll according to claim 2 wherein at least one of said slots is formed in the web portion of each member and at least one of said projections extends from the web portion of each member, each projection of one member being axially aligned with one of said slots of the other member.

5. The composite roll according to claim 2 wherein the members are substantially identical, and one of said projections and one of said slots of each member are relatively oppositely symmetrically disposed axially and radially for engagement of a projection of one member in a slot of the other member with said members being axially reversed.

6. The composite roll according to claim 5 wherein there are two said slots in and two said projections extending from the web portion of each member, with both said slots and both said projections equally spaced radially, and both said slots and both said projections equally spaced from ends of said members, with said slots spaced from one end and said projections spaced from the other end of each member.

7. The composite roll according to claim 2 wherein said web portion of each of said members has a diametrically extending surface disposed in face-to-face abutting relation to the diametrically extending surface of the web portion of the other member, with said at least one slot being formed in and said at least one projection extending from said diametrically extending surfaces.

8. The composite roll according to claim 7 wherein said at least one projection has an outer end spaced from said web portion and having a transverse extent greater than said at least one slot, said web portion that has said at least one slot has a thickness transverse to said diametrically extending surface substantially equal to the spacing of said projecting outer end from said web portion from which it extends.

9. The composite roll according to claim 2 wherein said at least one projection has an outer end having a transverse extent greater than said at least one slot for radial retention of said members in assembled condition.

10. The composite roll according to claim 2 wherein the transverse extent of the opening of said at least one slot and the corresponding transverse extent of said at least one projection form a substantially tight fit and said at least one slot widens inwardly of the opening to facilitate retention of said at least one projection of one member in said at least one slot of the other member and said members in assembled relation.

11. The composite roll according to claim 2 wherein said members are substantially identically formed, and each said member has at least one of said slots and at least one of said projections with each said at least one slot and one of said at least one projection of each member being spaced substantially equally from opposite axial ends of said members, whereby said members are interlocked with one member axially reversed with respect to the other member.

12. The composite roll according to claim 11 wherein said members are formed of molded plastic material and are moldable in a common mold.

13. The composite roll according to claim 1 wherein said members have inwardly projecting, axially extending ridges on the inner surfaces of said inner portions to facilitate mounting and retention of said composite roll on the shaft.

* * * * *